Figure 1:
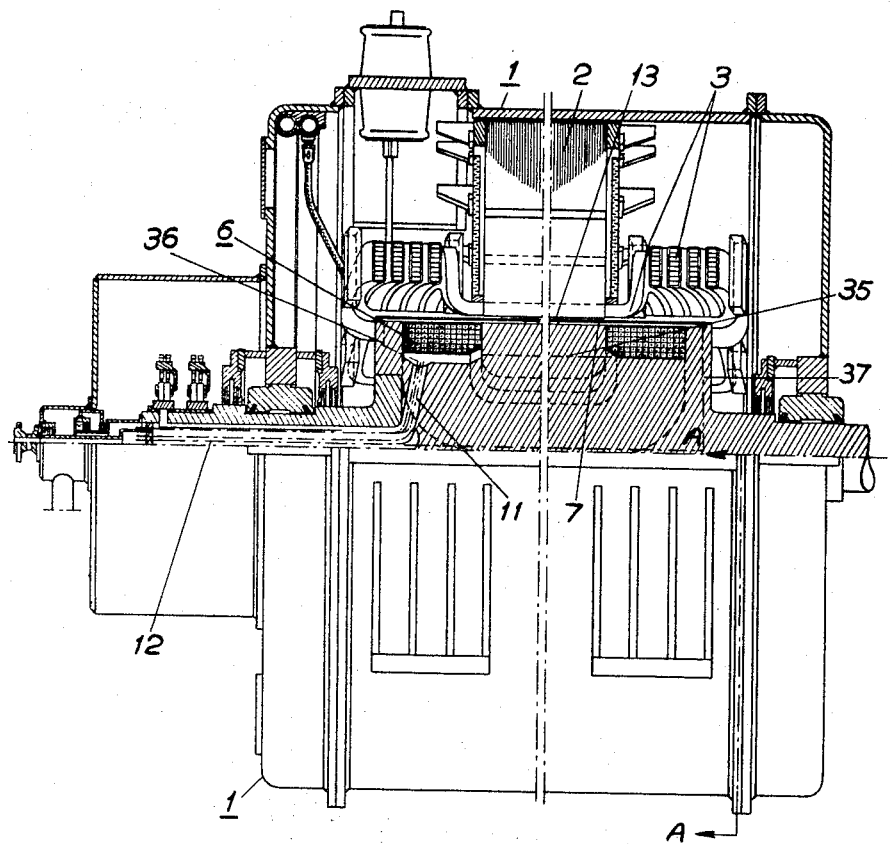

Oct. 8, 1968     K. D. MADSEN     3,405,297
STATOR STRUCTURE FOR A HIGH POWER SYNCHRONOUS MACHINE
HAVING HIGH AVERAGE INDUCTION IN THE AIR GAP

Filed Oct. 14, 1965     6 Sheets-Sheet 1

INVENTOR.
KRISTIAN DAHL MADSEN
BY
Bailey, Stephens & Huettig
ATTORNEYS

Oct. 8, 1968             K. D. MADSEN             3,405,297
STATOR STRUCTURE FOR A HIGH POWER SYNCHRONOUS MACHINE
HAVING HIGH AVERAGE INDUCTION IN THE AIR GAP
Filed Oct. 14, 1965             6 Sheets-Sheet 4
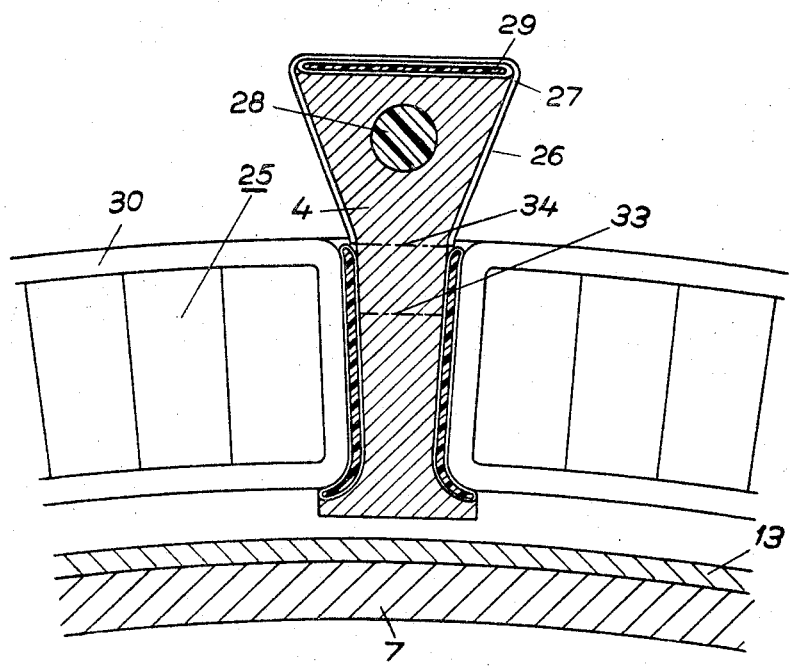
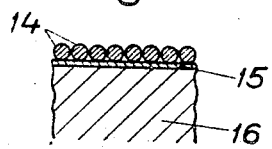 
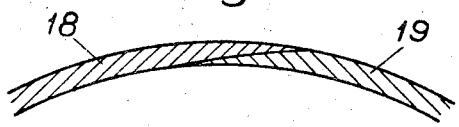
INVENTOR.
KRISTIAN DAHL MADSEN
BY
Bailey, Stephens & Huettig
ATTORNEYS

United States Patent Office 3,405,297
Patented Oct. 8, 1968

3,405,297
STATOR STRUCTURE FOR A HIGH POWER SYNCHRONOUS MACHINE HAVING HIGH AVERAGE INDUCTION IN THE AIR GAP
Kristian Dahl Madsen, Vasteras, Sweden, assignor to Allmänna Svenska Elektriska Aktiebolaget, Vasteras, Sweden, a corporation of Sweden
Filed Oct. 14, 1965, Ser. No. 495,873
Claims priority, application Sweden, Dec. 12, 1964, 15,068/64
17 Claims. (Cl. 310—258)

The present invention relates to a high power synchronous machine with high average induction in the air gap, for example 1.5 T, comprising a rotor with a rotor core and a field winding supported by the core, together with a laminated stator enclosing the rotor and having an armature winding composed of a number of stator coils.

By the expression high power machine is meant here a machine which has a power of more than 10 mva. A machine construction according to the invention can also be used with advantage for a power of 100 mva. and above.

It is already known that the power which a certain armature winding can deliver is approximately proportional to the average induction in the air gap. However, the hitherto known high power machines are constructed with a considerably lower air gap density than that for which a machine according to the invention is intended. An average density in the air gap of approximately 1 T is considered to be relatively high for a conventional machine. The limitation is due to an endeavour to avoid saturation in the armature teeth and the extremely noticeable increase in magnetic resistance of the air gap which such a saturation involves.

Through the investigations which are the basis of the present invention the conclusion has been reached that a high factor of utilisation of a machine having high average induction in the air gap presupposes that the armature teeth are eliminated to the greatest possible extent and that corresponding space is instead taken up by the armature winding, since very great saturation occurs in the teeth of such a machine so that the teeth contribute very little to reducing the magnetic resistance between rotor and stator. The optimum is to construct the stator with only so many and such wide teeth as is necessary from a purely mechanical point of view, i.e., for taking up the great short circuiting forces to which the armature winding is subjected, particularly in a tangential direction, due to the high air gap induction.

It has already been proposed to construct a high power synchronous machine of the inner pole type with a slotless stator. The known construction is, however, only intended to be used for certain special machines where an unusually large short circuiting condition is required and the demand for a high air gap is thus a primary consideration in dimensioning. In dimensioning the rotor of the known machine no particular measures have been taken to make the rotor suited for a specially high air gap induction and no effort has been made to exploit the possibilities for a high air gap flux density which exist through the absence of stator teeth. The armature winding is encapsuled in a hollow cylinder of insulating material and the forces influencing the winding are intended to be transmitted to the stator core by means of a number of axially running grooves and projections on the outer side of the hollow cylider and radially outside the armature conductors. Such a power transmission between armature winding and stator core involves the subjection of said hollow cylinder to strong shearing and tensile forces. In order to make the hollow cylinder sufficiently resistant to these forces, it has been dimensioned so that the part of the total wall volume of the hollow cylinder taken up by insulating material is considerably greater than is required from a purely insulating point of view, so that the copper content factor for the space between stator and rotor apparently must be relatively low. Since the average air gap density is relatively low—probably only about half the density which can normally be counted on with a machine according to the invention—it is possible that the hollow cylinder principle can provide a sufficiently good securing of the armature winding for the known machine. With a machine according to the invention, much greater short circuiting forces must be taken into account, and therefore the known method of constructing and securing the armature winding can hardly be considered suitable.

In a machine according to the invention the above-mentioned disadvantages are avoided. The invention relates to a high power synchronous machine having high average flux density in the air gap, for example 1.5 T, comprising a rotor with a rotor core and a field winding supported by this core, a laminated stator core enclosing the rotor, an armature winding supported by said stator core, said armature winding comprising a number of stator coils, said coils having axially directed coil sides, said coil sides being retained between axially directed stator teeth which are equally distributed along the air gap surface of the stator, the radial extension of said teeth being substantially as great as the radial dimension of the said coil sides, characterised in that the total average tangential extension of the space between two adjacent teeth is at least three times as great as the average width of each of the stator teeth.

According to a further development of the invention the stator teeth are made so that the whole tooth, or a radially inner portion of each tooth is made as a separate construction element which is attached to the laminated stator core, the whole tooth, or a radially outer portion of the tooth respectively, being mainly constructed of nonmagnetic material.

Further the invention relates to several constructive features making the rotor suited for the cooperation with a stator according to the invention.

Figure 2:
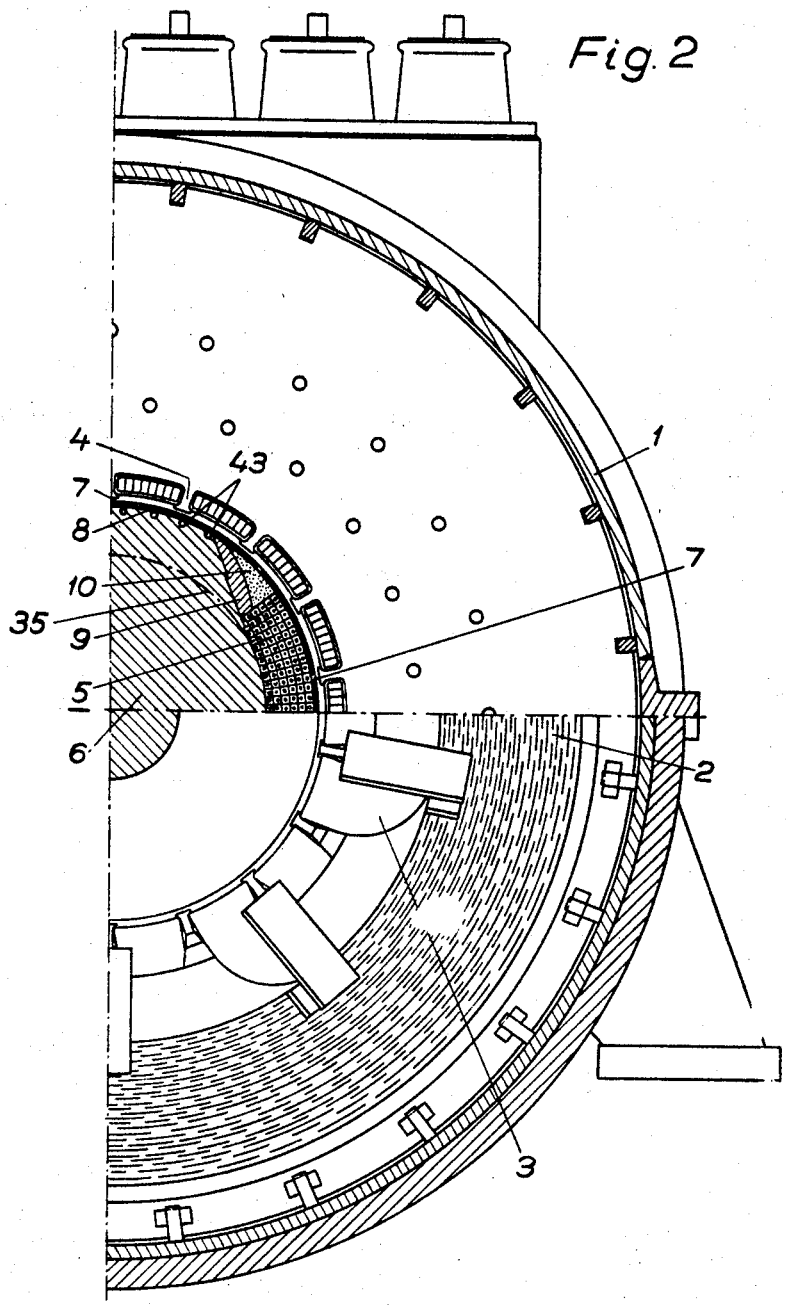
Figure 3:
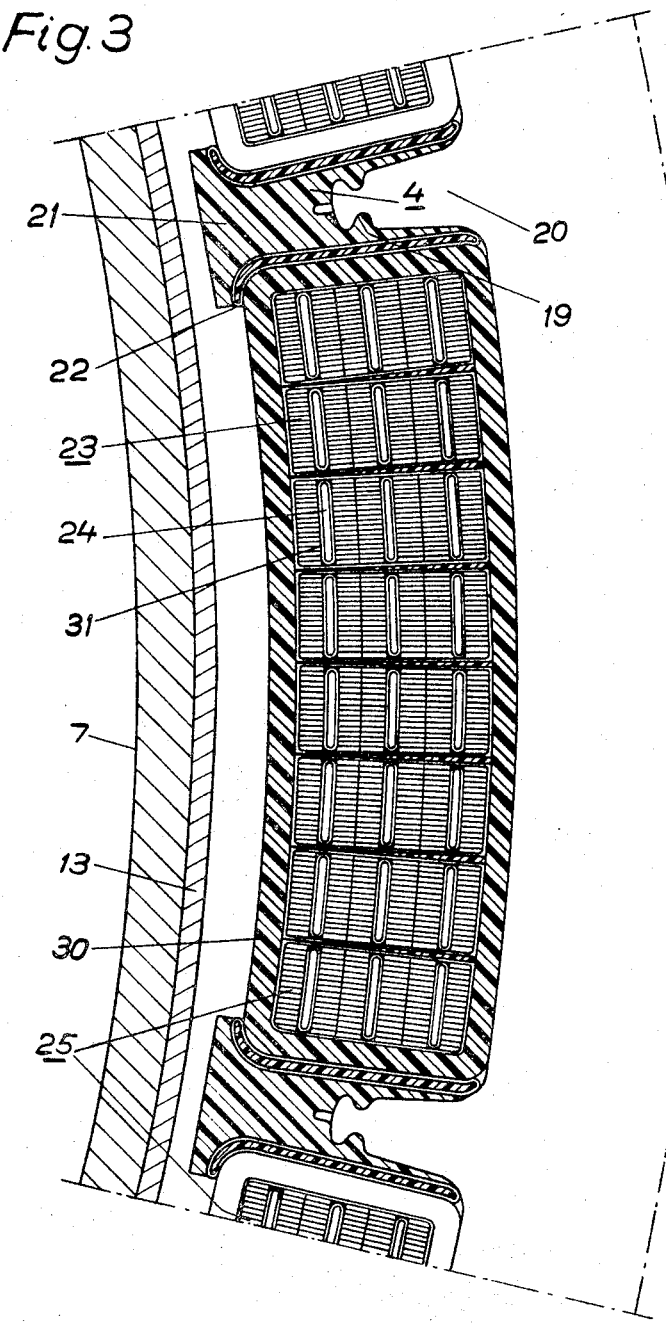
Figure 8:
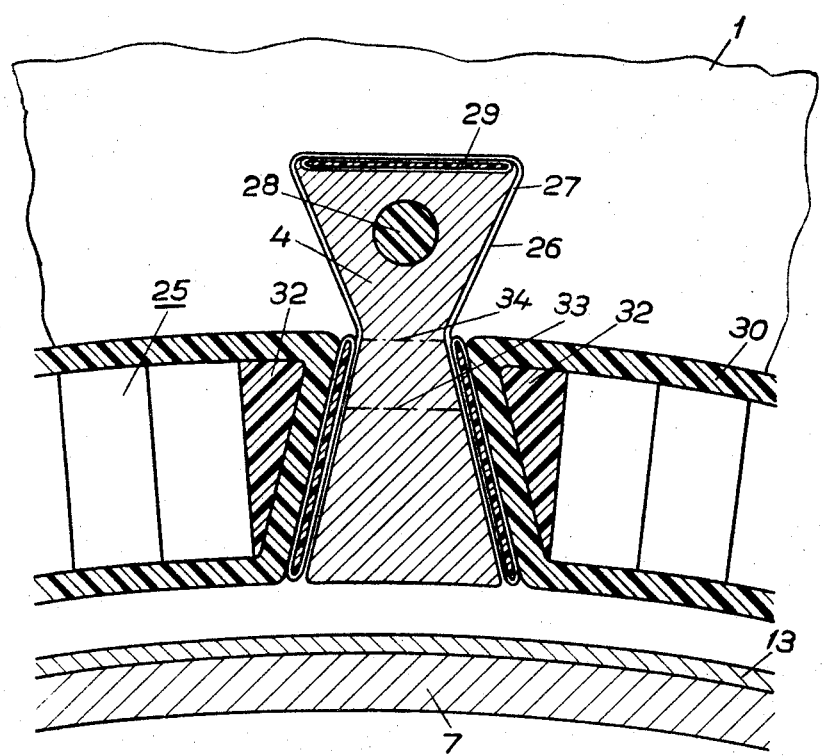
Figure 9:
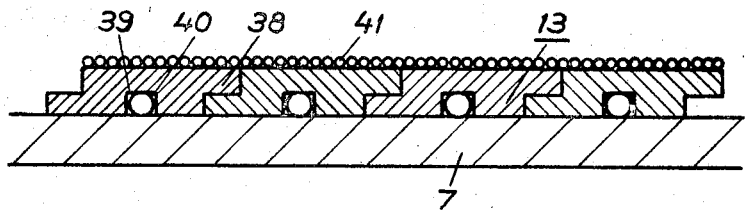

In the following the invention will be described with reference to the enclosed drawings, whereby FIGURE 1 shows a machine according to the invention, partly in side view and partly in axial section. FIGURE 2 shows half the machine, partly in a radial section through the middle of the pole, partly in a radial section along the line A—A in FIGURE 1. FIGURE 3, FIGURE 4 and FIGURE 8 show different embodiments of a stator tooth, FIGURES 5 to 7 show details of modifications of the enclosing cylinder, FIGURE 9 and FIGURE 10 show in axial section two different embodiments of the damping winding in a machine according to the invention.

In the figures 1 designates a casing in which a turbogenerator with power of 100 mva. and a revolution rate of 3,000 r.p.s. is encapsuled. The stator core 2 supports a directly cooled stator winding 3, which stator winding forms the armature winding of the machine. Each stator coil comprises eight turns and each coil is secured between two stator teeth 4 which are dimensioned to take up forces influencing the side of one coil at short circuiting. The stator teeth have little or no importance as conductors for the machine flux since the total tooth width is very small in relation to the stator circumference. From a magnetic point of view, therefore, the stator may be considered as a slotless stator. The machine has a two-pole rotor specially constructed to be able to provide the high amount of field ampere turns required by a slotless stator. The rotor winding is formed of one saddle-shaped coil for each pole. The axially running part of a rotor coil is designated 5 and the parts running axially outside the air gap are designated 6. The part of the rotor core surrounded by the stator core is composed of two coherent poles which, together with one of the shaft extensions and other parts of the rotor core situated axially outside the air gap, are constructed in one piece. Outside the air gap the rotor core is designed with tangentially running grooves in which the coil ends 6 are placed. Each end of the rotor is made with a cylindrical part situated outside the coil ends, the radial extension of said part being equal to the maximum pole height and constant along its entire circumference. The rotor is provided with a homogeneous hollow cylinder 7 made of special steel having very great strength and arranged to lie close to the air gap surfaces 8 of the poles, to the complete surface facing radially outwards of each rotor coil, and to the circular cylindrical surfaces of the parts which are situated axially outside the coil ends and coherent with the rotor core. To each pole two longitudinal pole parts are screwed, each of which is formed with a cross section which has substantially the shape of a circular segment with a cut-off point, and which is engaged with the rest of the pole by a terraced surface. To some extent said pole parts give tangential support to the axially running parts of the rotor winding. In the same way the rotor winding is retained by the filling bodies 10 which are made of nonmagnetic material. The poles may even be demountable along the dotted line 35. As is clear from the above, the rotor winding is encapsuled in a hollow space formed between the hollow cylinder 8 and surfaces formed radially inside the air gap surfaces of the rotor core. This hollow space is connected by means of radially running channels 11 in the rotor core to an axially directed channel 12 drilled in one of the shaft extensions. The electrical connections between the terminals and the rotor winding, and a relatively large number of tubes carrying coolant to the directly cooled rotor parts, are situated in the channels 11 and 12. The rotor winding is retained very compactly in the above-mentioned hollow space, since this is vacuum-impregnated with epoxy resin pumped in under high pressure through such parts of the cross-sections of channels 11 and 12 which are not taken up by cooling tubes and electrical conductors. By maintaining high pressure on the epoxy resin during the curing, a very strong prestressing of the hollow cylinder 7 is obtained in the finished rotor so that the radially directed pressure between pole cores and rotor winding, despite the large centrifugal forces, can be maintained right up to the maximum revolution rate. This means that the hollow cylinder is not subjected to stretching and therefore gives a reliable fixing of the rotor winding under all operating conditions. Since the hollow cylinder 7 is made of magnetic material, it forms a magnetic connection from pole to pole through which flows a leakage flux. Since the machine is designed for extremely high flux, 1.5 T, however, the magnetic connection becomes saturated at a rotor M.M.F. which is very small in relation to the normal value, and the leakage flux through the ring therefore constitutes a relatively small, completely acceptable part of the main flux. Since the hollow cylinder 7, contrary to similar rings in known, otherwise conventional turbo-generators, is made of magnetic material, the part of the hollow cylinder lying close to the pole surface gives a reduction of the air gap and a consequential increase in machine flux which entirely compensates for the leakage flux flowing through the ring. It should be pointed out that it is not necessary for the hollow cylinder to be as easily magnetisable as the rotor core. The magnetic conductivity of stainless steel obtained by cold-treating is sufficient. As is clear from the figures, the rotor winding is substantially formed with the same radial thickness all over, which dimension also constitutes the maximum radial dimension. This contributes to a good utilisation of material, since it is the maximum thickness in a radial direction of the rotor winding which determines the dimensioning of the hollow cylinder 7. Such a design of the axially directed parts of the rotor winding has successfully been combined with a functionally correct shaping of the pole cross section. Contrary to what is the case with conventional two-pole rotors, the pole width is considerably larger in the radial inner parts of the pole than at the air gap surface. Thus it is attained that the flux density is substantially constant everywhere in the part of the rotor core which is surrounded by the stator core, as attention is paid to the stray flux which penetrates the axially running parts of the rotor winding. In FIGURE 1, and also in FIGURES 3 and 4, 13 designates a damping winding consisting of several turns of copper wire wound helically on to the pole cylinder and soldered together, and FIGURE 9 and FIGURE 10 show in detail two different embodiments of the damping winding 13. In FIGURE 9 the damping winding is wound from a tin-plated copper wire whose cross section is shaped in such a way that the various turns overlap each other while a constant radial dimension is maintained. The wire is provided with a channel 39 running in the longitudinal direction of the wire, in which a cooling duct 40 is arranged. With the intention of reducing the through-flow resistance of the coolant the wire is wound "multithreaded," i.e., so that several helical cooling channels form parallel paths for the coolant. Radial supply and outlet channels for the coolant of the damping winding, 36, 37 in FIGURE 1, are arranged in the rotor iron and connected to corresponding centrally arranged, axially directed channels. Outside the damping winding is a layer of tempered and strongly prestressed steel wire 41 which serves the purpose of taking up the centrifugal forces influencing the damping winding, and which also contributes to providing a good electrical contact in the contact surface between adjacent turns by pressing together parts of the damping winding situated radially outside each other.

Figure 10:
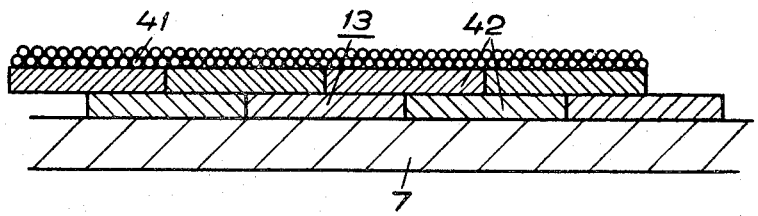

In the embodiment shown in FIGURE 10 the damping winding is wound from rectangular copper wire and is not provided with cooling channels. As in FIGURE 9, 41 designates prestressed steel wire. A considerable part of the heat generated in the damping winding will be carried away by means of the rotor winding cooling system. Furthermore—when such a damping winding is used—the radially outer part of the poles is provided with cooling ducts which are supplied with coolant via radial and centrally running axial channels in the rotor iron. Said cooling ducts, which in FIGURE 2 are designated 43, are sepecifically intended to conduct away the heat carried to the poles from the damping winding via the hollow cylinder 7.

The machine described in connection with FIGURES 1 and 2 provides only one of several possible embodiments of the invention. Instead of the homogeneous cylinder 7 manufactured from special steel, a combination of several different construction elements may be used. For example, a hollow cylinder of relatively thin metal lying close to the winding and to the air gap surfaces of the pole may be used and, in combination with this cylinder, an extremely strong cylinder surrounding the former, the latter being manufactured by winding a large number of turns of hard-drawn and prestressed steel wire immediately beside each other in axial direction and in one or several layers. The steel wire is preferably wound with such great prestressing that centrifugal forces arising do not cause any noticeable stretching of the wound cylinder. Part of a rotor constructed in this manner is shown in the axial section in FIGURE 5 where 14 designates the prestressed steel wire, 15 the hollow cylinder situated within and 16 the rotor poles.

Instead of a steel cylinder homogeneous in all directions, for example that shown in FIGURES 1 and 2, or instead of the wound steel cylinder in FIGURE 5, a ring may be used which is formed of steel rings arranged axially one after the other and welded together, as shown in FIGURE 6. Further, with the intention of decreasing the stray flux, it may be advantageous to construct the hollow cylinder from peripherally consecutive sectors made from alternately magnetic and nonmagnetic material and arrange the hollow cylinder with the magnetic sectors adjacent to the air gap surface of the poles and the nonmagnetic sectors adjacent to the axially directed parts of the winding. FIGURE 7 shows in radial section part of such a hollow cylinder where 18 designates a magnetic sector and 19 a nonmagnetic one. The ring sectors 18 and 19 are soldered together in a substantially tangentially running joint surface.

In FIGURE 3, 20 designates an axially running, radially directed projection made in the stator core, which has been effected by punching the stator laminations with corresponding projections. The tooth 4 consists, furthermore, of a body 21 made of glass fibre laminate which is secured to the projection 20 by means of axially running grooves 19 formed in the projection 20 and engaged with corresponding tangentially directed and axially running projections on the nonmagnetic body 21. The body 21 may also be manufactured from punched metal pieces of material with low magnetic conductivity, said metal pieces being electrically insulated from each other. A considerable pressure between the stator tooth and adjacent coils 25 is brought about by means of the flattened tubes 22 filled with epoxy resin, into which the epoxy resin is injected and cured under high pressure. Since the body 21 is made of nonmagnetic material, the minimum distance between rotor and stator will be relatively large and the flux pulsations caused by the projections 20 will not give rise to any noticeable eddy current losses in the rotor.

Even with the construction of the stator tooth 4 shown in FIGURE 4, the avoidance of magnetic pulsations of tooth frequency has been considered. The tooth is entirely made of nonmagnetic material and fixed in an axially directed dove-tail groove 26 in the stator sections and insulated from the stator sections by means of the insulation 27. The tooth is built up of a number of punched parts insulated from each other, which are stacked in an axial direction and held together by means of a fibre-glass rod 28. The stator tooth 4 may also consist of insulated punched metal parts of nonmagnetic material mixed with a number of punched metal pieces of magnetic material. The magnetic metal pieces may be shorter than the nonmagnetic ones and only fill the dovetail groove 26 and extend to the line 33. Such a design protects the rotor surface from magnetic pulsations from the groove 26. The metal pieces may even be punched from metal consisting of previously welded strips of magnetic metal and nonmagnetic metal so that the welding joint or the punching lies along the line 34 and the magnetic part is situated in the groove 26. Between the tooth and adjacent coils 25 flattened tubes 22 filled with epoxy resin are arranged in the same way as in FIGURE 3 and a similar tube 29 is arranged between the tooth 4 and the bottom of the groove.

The stator tooth shown in FIGURE 8 differs from that shown in FIGURE 4 in that the part running radially inside the stator lamination stack is formed with a width increasing evenly in the radial direction. The result is that no part of the tooth is situated radially inside the radially inner surface of the coil insulation 30. Thus—with a certain magnetic air gap—a mechanical air gap is obtained which is smaller than that which can be obtained by means of the tooth constructions shown in FIGURES 3 and 4. The inclined surface of a coil side adjacent to the tooth and intended to secure it in the radial direction is formed with the help of longitudinal filling bodies 32 of insulating material.

Since it has proved that the main part of the eddy current losses generated in the conductor of a machine according to the invention is caused by the radial component of the main flux, each armature conductor 23 is built up of a large number of tangentially consecutive semiconductors insulated from each other. Since there is also a certain tangentially directed flux component, the conductor is also divided in the radial direction, but with considerably larger divisions than in the tangential direction. It has been found that the special conditions in a machine according to the invention require surprisingly small dimensions for the semiconductors. For 50–60 cycles per second the tangential dimension may not be greater than 2.5 mm. and the radial dimension should not be greater than 10 mm. if a serviceable machine is to be obtained. The division in the radial direction demands a corresponding transposition, while the tangential division should be carried out without corresponding transposition of semiconductors.

As is evident from FIGURE 3 each coil side in the stator of the machine shown in FIGURE 1 is composed of 24 directly cooled conductors which, with the assistance of the surrounding coil insulation 30, are held together in a rigid stack. Since the radially inwardly directed forces to which the coil side may be subjected are very small in comparison with the forces operating in the tangential direction upon a short circuit, the coil side, despite its considerable tangential extension, is sufficiently rigid to resist radially inwardly directed forces without deformation. The fact that the stator coil is entirely vacuum-impregnated with epoxy resin and cured also contributes to this. The arched cross section of the coil side together with the extremely strong tangentially operating forces on the radially directed surfaces of the coil side also contribute to giving the coil side good resistance against radially inwardly operating forces. So that the cooling channels 24 shall not be closed during the vacuum-impregnation, these are formed by flattened tubes of stainless steel 31 which are insulated from the surrounding part-conductors. As shown in the drawings, the coil sides are secured in the radial direction inwards by shaping the radially inner part of the stator teeth with increased width. When the coil side is constructed as a rigid stack it is necessary to construct the teeth in such a way that the whole tooth or the radially outer part of it forms a special construction element which can be mounted on the stator sections by axial insertion. With a machine according to the invention the stator is divided into two halves by a horizontal plane and the winding is mounted by placing all the stator coils in the stator with one coil side in the lower half of the stator. The upper half of the stator is then lifted into position and joined together to the lower half, after which loose stator teeth or alternatively radially outer parts of the stator teeth are inserted in axially running grooves between two adjacent coil sides, and in this way attached to the stator lamination stack.

The constructions shown in the drawings provide only examples of embodiments within the scope of the invention and many other embodiments may be imagined. For example, a machine according to the invention can equally well be constructed with more than two poles. Furthermore, the tension elements 22, 29 situated close to the stator teeth may be replaced by wedges or the like.

With the intention of achieving a favourable shape of the magnetic field generated by the rotor winding, it may in certain cases be advantageous to place longitudinal, radially directed strips of magnetic metal in several places within the longitudinal parts of the rotor coils.

I claim:

1. High power synchronous machine having high average flux density in the air gap, comprising a rotor with a rotor core and a field winding supported by the core, a laminated stator core member enclosing the rotor, an armature winding supported by said stator core member, said armature winding comprising a number of stator coils, said coils having axially directed coil sides, axially directed stator tooth members which are equally distributed along the air gap surface of the stator, and between which the coil sides are retained, the radial extension of said tooth members being substantially as great as the radial dimension of the said coil sides, the total average tangential extension of the space between two adjacent tooth members being at least three times as great as the average width of each of the stator tooth members.

2. High power synchronous machine according to claim 1, all conductors situated between two stator tooth members forming a rigid coil side, coil insulation surrounding such coil side, said tooth members having a radial inner section which has greater width than a tooth member section situated radially outside such inner section, one of said stator core and tooth members, for at least half of the tooth members, having grooves therein and the other of such members having parts engaging in said grooves.

3. High power synchronous machine according to claim 2, said tooth members being formed at least partly of substantially nonmagnetic material.

4. High power synchronous machine according to claim 1, the stator being provided with a plurality of tension members arranged between the stator tooth members and the adjacent coil sides.

5. High power synchronous machine according to claim 4, comprising flattened tubes between stator tooth and adjacent coil sides, and a hardened curable mass within the tubes cured under high pressure therein.

6. High power synchronous machine according to claim 4, each tooth, together with a flattened tube arranged radially outside the tooth, being positioned in an axially running dove-tail groove in the stator laminations, and a hardened curable mass within the tube cured under high pressure therein.

7. High power synchronous machine according to claim 1, the stator core having radially inwardly facing dove-tail grooves and each tooth member having an element fitted into said dove-tail groove, and a tension member at the bottom of the groove for exerting a radially directed pressure on said tooth member.

8. High power synchronous machine according to claim 1, the stator core having a radial projection for each tooth member, said projection having a radial extension which is less than the radial thickness of the stator winding and is provided with at least one axially running groove, each tooth member having a corresponding axially running, tangentially directed projection arranged radially inside said stator core projection.

9. High power synchronous machine according to claim 8, the number of projections punched out in the stator laminations and fitting into one tooth member being less than the number of stator laminations consecutively stacked in the axial direction.

10. High power synchronous machine according to claim 9, the tooth width and tangential distance between two coil surfaces facing one and the same tooth member increasing evenly with decreasing distance from the center line of the rotor, at least for a part of the radial extension of the coil side, and the tooth member top lying substantially on the same radius as the radially inner surface of the coil side.

11. High power synchronous machine according to claim 9, said tooth member containing a number of metal punchings arranged close together in the axial direction, the punchings being electrically insulated from each other and bound together.

12. High power synchronous machine according to claim 11, each tooth containing both laminations of nonmagnetic and laminations of magnetic material, the magnetic laminations having a radial extent which is less than the corresponding dimension of the nonmagnetic laminations.

13. High power synchronous machine according to claim 11, each tooth lamination comprising two parts welded together and arranged consecutively in the radial direction, one of which is made of magnetic and the other of nonmagnetic material.

14. High power synchronous machine according to claim 13, comprising at least one strip of magnetic metal welded together with at least one strip of nonmagnetic metal, the welded strips being rolled down to considerably less thickness, and said tooth sections being punched out in such a way that the part of the tooth section intended for the dove-tail groove of the stator consists of magnetic material and the other part of the tooth section of nonmagnetic material.

15. High power synchronous machine according to claim 1, the stator coils comprising insulated stator-conductors each containing at least five partial conductors insulated from each other and arranged tangentially beside each other.

16. High power synchronous machine according to claim 15, said insulated conductors being divided into insulated partial conductors both in the tangential and the radial direction.

17. High power synchronous machine according to claim 16, the average density in the air gap being greater than 1.2 Tesla, the frequency of the machine lies within the range 50–60 cycles per second, the radial dimension of the partial conductors is less than 10 mm. and their tangential dimension less than 2.5 mm.

No references cited.

MILTON O. HIRSHFIELD, *Primary Examiner.*

L. L. SMITH, *Assistant Examiner.*